Patented Jan. 4, 1938

2,104,084

UNITED STATES PATENT OFFICE 2,104,084

STABILIZATION OF ANIMAL AND VEGETABLE FATS AND OILS

George H. Latham, Wilmington, Del., assignor to E. I. du Pont de Nemours & Company, Wilmington, Del., a corporation of Delaware No Drawing. Application November 6, 1935, Serial No. 48,496

10 Claims. (Cl. 87—12)

This invention relates to the stabilization of animal and vegetable fats and oils and, more particularly to the inhibition of the development of rancidity therein.

Many compounds are known which will prevent the development of rancidity in animal and vegetable fats and oils but practically all of them are unsuitable because they are either toxic and therefore cannot be used for stabilizing the edible oils and fats, or else they impart bad odor and taste to such fats and oils. Some of these compounds are so volatile that they are removed from the fats and oils during cooking or in deep-fat frying operations, while others are relatively insoluble in the fats and oils.

An object of the present invention is to provide a new class of stabilizers for animal and vegetable fats and oils which will inhibit or retard deterioration by development of rancidity in such fats and oils. A further object is to provide stabilizers which are suitable for edible fats and oils. Other objects are to stabilize animal and vegetable fats and oils, and particularly the edible fats and oils. Still further objects are to provide new compositions of matter and to advance the art. Other objects will appear hereinafter.

These objects may be accomplished in accordance with my invention which comprises incorporating, in animal and vegetable fats and oils normally tending to become rancid, a small amount, sufficient to inhibit rancidity development therein, of a phenol having at least one alkoxy group in at least one of the positions ortho and para to a phenolic hydroxyl group and at least one hydroxy aliphatic group in which at least one carbon atom of which is directly bonded to a carbon atom of the aromatic ring, said phenol consisting of carbon, hydrogen and oxygen. These phenols may contain a plurality of hydroxyl, alkoxy, or aliphatic groups besides those above specified. The oils and fats so treated are much more resistant to rancidity development than are untreated oils and fats.

By the phrase "said phenol consisting of carbon, hydrogen and oxygen", I mean that the complete compound consists of carbon, hydrogen and oxygen, and is devoid of other elements.

While the broad class of compounds mentioned hereinbefore will, in general, be effective for my purposes, I prefer the mononuclear phenols although the polynuclear phenols, and particularly those of the naphthalene and diphenyl series, may be employed. Amongst the compounds which I have found to be particularly satisfactory for my purpose are vanillyl alcohol and coniferyl alcohol.

The oils and fats which I propose to stabilize are animal and vegetable in origin and are glycerides of the more or less unsaturated higher fatty acids mixed, of course, with some saturated glycerides. Amongst the fats and oils which may be stabilized are linseed oil, China-wood oil, cod liver oil, or the highly unsaturated glycerides which, for the most part, compose them. In general, this invention is particularly directed to the stabilization of those fats and oils which have iodine numbers below 120, examples of which are castor oil, olive oil, rapeseed oil, coconut oil, palm oil, corn oil, sesame oil, peanut oil, neat's foot oil, butter fat, lard, beef tallow, and hydrogenated oils and fats such as are sold under the trade names of "Crisco" and "Snowdrift". I do not wish to be limited to the use of my compounds in the raw oils and fats, since, for certain uses, the oil or fat may be previously subjected to various treatments, such as blowing with air at more or less elevated temperatures or to simple heat treatments. My compounds and the edible oils and fats containing them can furthermore be used as ingredients in the preparation of pastries and other bakery products, potato chips, mayonnaise, salad oils, and the like. They may be used alone or in combination with other materials as textile dressings, lubricants and the like. However, my compounds are particularly adapted for use in edible and medicinal oils and fats and in food products in which such oils and fats are ingredients.

The concentration in which my agents may be used will vary with the kind of oil or fat to be stabilized, the degree of stabilization desired, the particular agent and other considerations depending upon the desire of the user. The compounds will, in general, be used in concentrations of from about 0.001% to about 1.0% based on the oil or fat to be stabilized.

In order to more clearly illustrate my invention, the preferred modes of carrying the same into effect and the advantageous results to be obtained thereby, the following examples are given:

Example 1

A portion of refined cottonseed oil was divided into two parts. One part was retained as a blank or control and to the other was added one per cent of vanillyl alcohol. Pieces of filter paper of standard size and type were saturated with the two portions of oil, blotted to remove excess oil, stored in stoppered bottles at 65° C., and (in duplicate experiments) at room temperature, and examined daily for rancid odor, discoloration, etc. Results were as follows:

| Agent (1% concentration) | Days for rancidity to develop | |
| --- | --- | --- |
| | 65° C. | Room temperature |
| None (untreated oil) | 1 | 13 |
| Vanillyl alcohol | 3 | 34 |

*Example 2*

Refined cottonseed oil containing one per cent of coniferyl alcohol was tested as in Example 1. Results were as follows:

| Agent (1% concentration) | Discoloration | days for rancidity to develop | |
| --- | --- | --- | --- |
| | Produced | 65° C. | Room temperature |
| None (untreated oil) | None | 1 | 13 |
| Coniferyl alcohol | do | 2 | 26 |

Coniferyl alcohol has no appreciable odor or taste, and does not discolor oils or fats.

*Example 3*

One per cent of vanillyl alcohol was incorporated into a portion of melted lard by stirring and the treated lard, together with an untreated portion thereof, heated in air with frequent stirring for one hour at 200° C. Potato chips were fried under the same conditions in each portion, drained of excess lard, stored in stoppered bottles at 65° and tested daily for rancidity development. The two portions of lard were then heated 11 hours longer under the same conditions, and another series of potato chips was fried and tested in the same manner. Results were as follows:

| Agent (1% concentration) | Days for rancidity development of potato chips fried after lard was heated number of hours indicated | |
| --- | --- | --- |
| | 1 hour | 12 hour |
| None (untreated lard) | 8 | 13 |
| Vanillyl alcohol | 27 | 26 |

These results show that the stabilizer continues to function even on prolonged heating in oil, indicating that it will protect food products such as pastries, etc., after they have been cooked. Many stabilizers lose their effectiveness on heating.

In place of the specific compounds mentioned in the examples, I may employ any of the following compounds:

Methylol-hydroquinone monomethyl ether.
Methylol hydroquinone monododecyl ether.
4-methylol-2-dodecoxy phenol (dodecyl analog of vanillyl alcohol).
2,6-dimethoxy-4-methylol phenol.
2-methylol-6-decoxy phenol.
2-methylol-4-undecoxy phenol.

Mixtures of two or more of my agents may also be employed in any of the oils or fats hereinbefore mentioned or in mixtures of such oils and fats or compositions containing them. Ethers of the alcohols hereinbefore disclosed may also be used in some cases, and as an example of an ether of the class, divanillyl ether may be mentioned.

It is a characteristic of the compounds covered by this invention that they cause little or no discoloration or objectionable odor or taste in the animal and vegetable fats and oils. This feature of my compounds is especially important with respect to the edible fats and oils because objectionable taste, odor or color cannot be tolerated in foods. The low volatility of certain of my compounds is a particularly valuable feature which makes for permanence in the oil or fat, even when such fat or oil is subjected to heating as in cooking or deep-fat frying operations. A third distinct advantage of my compounds is that they are for the most part substantially insoluble in water but soluble in the oils or fats which I wish to stabilize, so that they will not be removed from such oils and fats in cooking operations in which they come into more or less contact with water. Furthermore, their stabilizing properties are not destroyed by heat in cooking and deep-fat frying operations.

While I have disclosed the preferred embodiments of my invention and the preferred modes of carrying the same into effect, many variations and modifications may be made therein and will be apparent to those skilled in the art. Accordingly, the scope of my invention is to be limited solely by the appended claims construed as broadly as is permissible in view of the prior art.

I claim:

1. Animal and vegetable fats and oils normally tending to become rancid having incorporated therein, in an amount sufficient to inhibit rancidity development, a phenol having at least one alkoxy group in at least one of the positions ortho and para to a phenolic hydroxyl group and at least one hydroxy aliphatic group in which at least one carbon atom is directly bonded to a carbon atom of the aromatic ring, said phenol consisting of carbon, hydrogen and oxygen.

2. Animal and vegetable fats and oils normally tending to become rancid having incorporated therein, in an amount sufficient to inhibit rancidity development, a phenol of the benzene series having at least one alkoxy group in at least one of the positions ortho and para to a phenolic hydroxyl group and at least one hydroxy aliphatic group in which at least one carbon atom is directly bonded to a carbon atom of the aromatic ring, said phenol consisting of carbon, hydrogen and oxygen.

3. Animal and vegetable fats and oils normally tending to become rancid having incorporated therein, in an amount sufficient to inhibit rancidity development, a monohydroxy aromatic compound having at least one alkoxy group in at least one of the positions ortho and para to the phenolic hydroxyl group and a hydroxy aliphatic group in which a carbon atom is directly bonded to a carbon atom of the aromatic ring, said compound consisting of carbon, hydrogen and oxygen.

4. Animal and vegetable fats and oils normally tending to become rancid having incorporated therein, in an amount sufficient to inhibit rancidity development, a monohydroxy aromatic compound of the benzene series having at least one alkoxy group in at least one of the positions ortho and para to the phenolic hydroxyl group and a hydroxy aliphatic group in which a carbon atom is directly bonded to a carbon atom of the aromatic ring, said compound consisting of carbon, hydrogen and oxygen.

5. Animal and vegetable fats and oils normally tending to become rancid having incorporated therein, in an amount sufficient to inhibit rancidity development, a monohydroxy aromatic compound having an alkoxy group in the position ortho to the phenolic hydroxyl group and a hydroxy aliphatic group in the para position, a carbon atom of the hydroxy aliphatic group being directly bonded to a carbon of the aromatic ring, said compound consisting of carbon, hydrogen and oxygen.

6. Animal and vegetable fats and oils normally tending to become rancid having incorporated therein, in an amount sufficient to inhibit rancidity development, a monohydroxy aromatic compound of the benezene series having an alkoxy group in the position ortho to the phenolic hydroxyl group and a hydroxy aliphatic group in the para position, a carbon atom of the hydroxy aliphatic group being directly bonded to a carbon of the aromatic ring, said compound consisting of carbon, hydrogen and oxygen.

7. Edible animal and vegetable fats and oils normally tending to become rancid having incorporated therein, in an amount sufficient to inhibit rancidity development, a phenol having at least one alkoxy group in an least one of the positions ortho and para to a phenolic hydroxyl group and at least one hydroxy aliphatic group in which at least one carbon atom is directly bonded to a carbon of the aromatic ring, said phenol consisting of carbon, hydrogen and oxygen.

8. The method of retarding the development of rancidity in animal and vegetable fats and oils and compositions containing them which comprises incorporating therein, in an amount sufficient to inhibit rancidity development, a phenol having at least one alkoxy group in at least one of the positions ortho and para to a phenolic hydroxyl group and at least one hydroxy aliphatic group in which at least one carbon atom is bonded to a carbon of the aromatic ring, said phenol consisting of carbon, hydrogen and oxygen.

9. Animal and vegetable fats and oils normally tending to become rancid having incorporated therein, in an amount sufficient to inhibit rancidity development, vanillyl alcohol.

10. Animal and vegetable fats and oils normally tending to become rancid having incorporated therein, in an amount sufficient to inhibit rancidity development, coniferyl alcohol.

GEORGE H. LATHAM.